Figure 1:
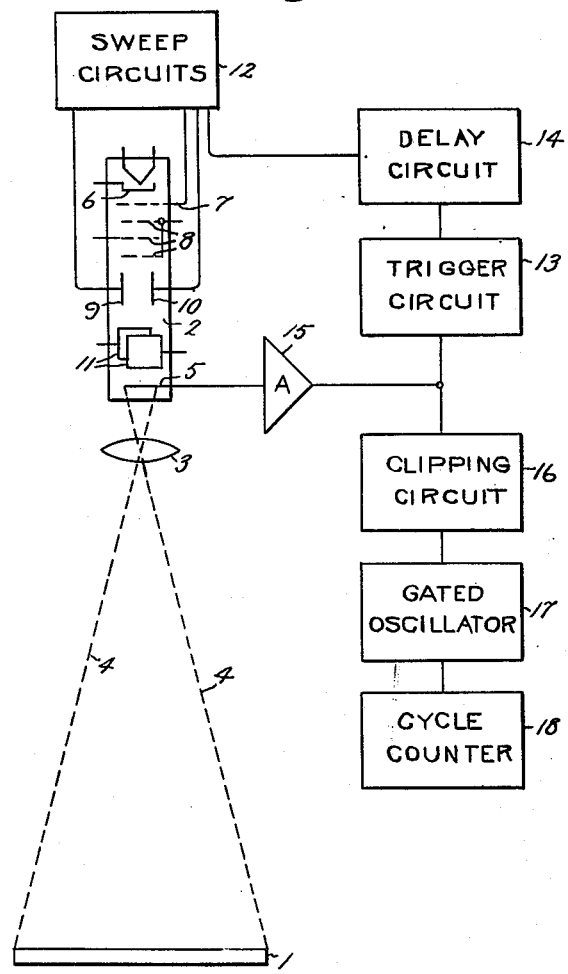

April 13, 1954

R. E. ANDERSON 2,674,915

NONCONTACTING WIDTH GAUGE

Filed Jan. 7, 1950

6 Sheets-Sheet 1

Inventor:
Roy E. Anderson,
by Paul A. Frank
His Attorney.

April 13, 1954 R. E. ANDERSON 2,674,915
NONCONTACTING WIDTH GAUGE
Filed Jan. 7, 1950 6 Sheets-Sheet 2
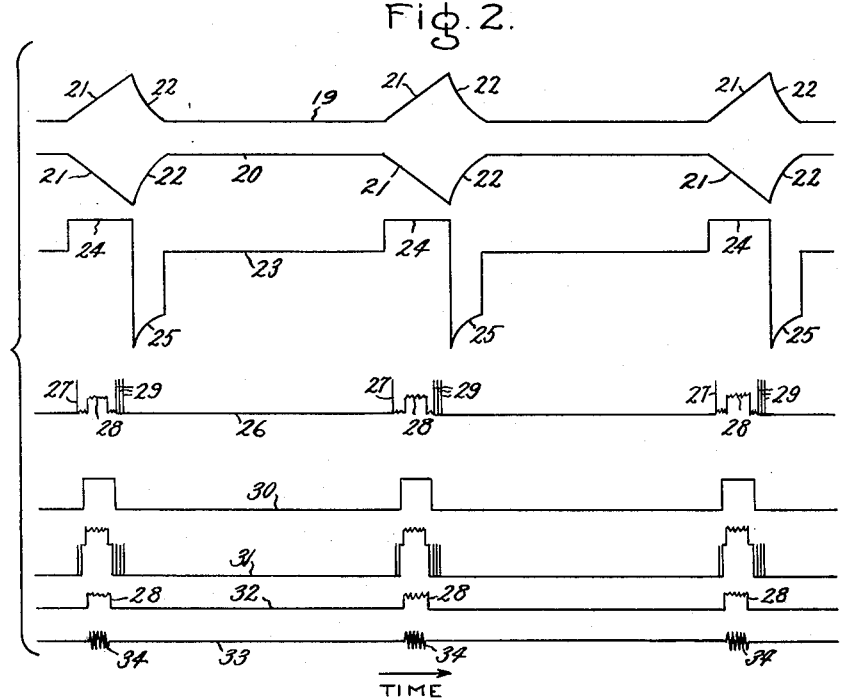
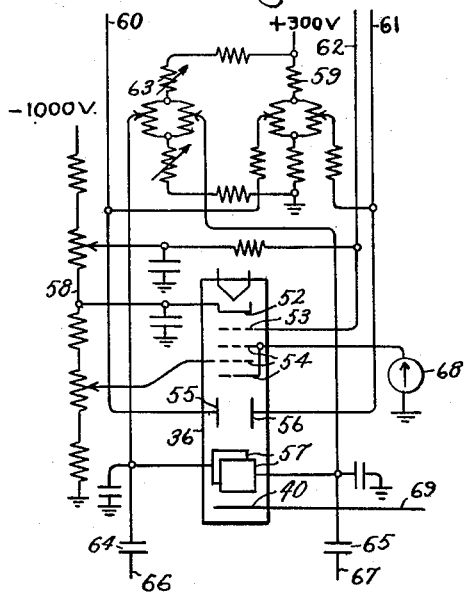
Inventor:
Roy E. Anderson,
by Paul A. Frank
His Attorney.

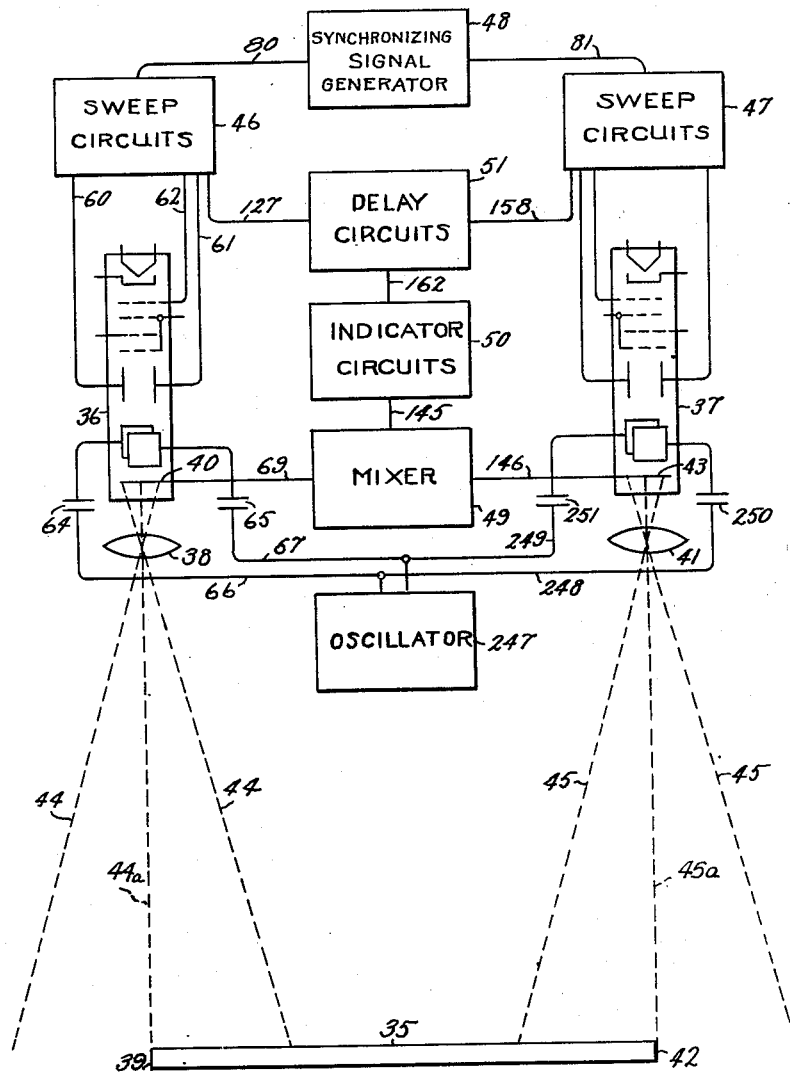

April 13, 1954  R. E. ANDERSON  2,674,915
NONCONTACTING WIDTH GAUGE
Filed Jan. 7, 1950  6 Sheets-Sheet 4
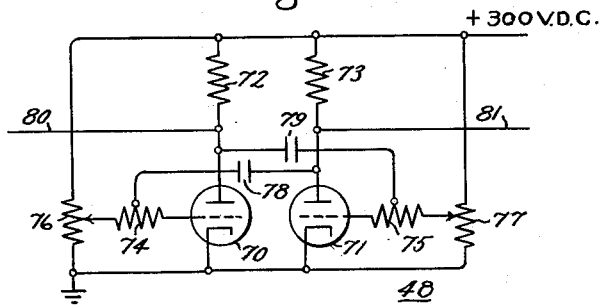
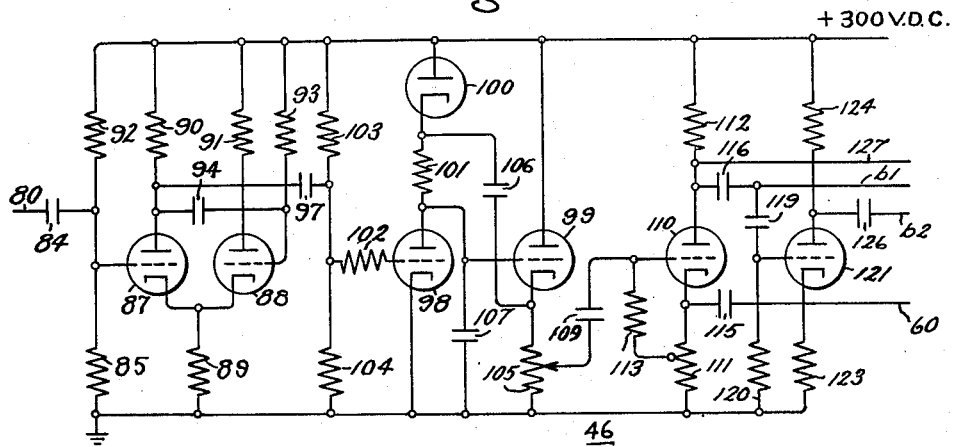
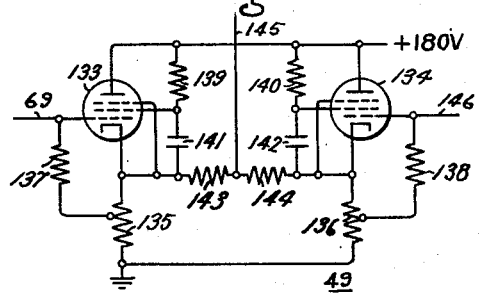 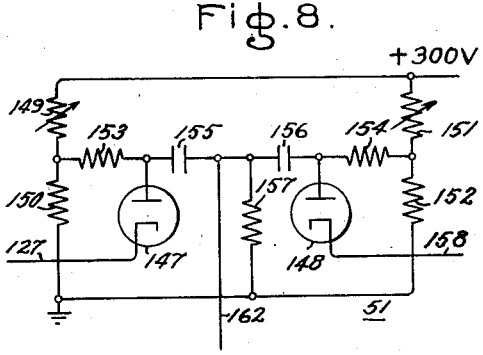
Inventor:
Roy E. Anderson,
by Paul A. Frank
His Attorney.

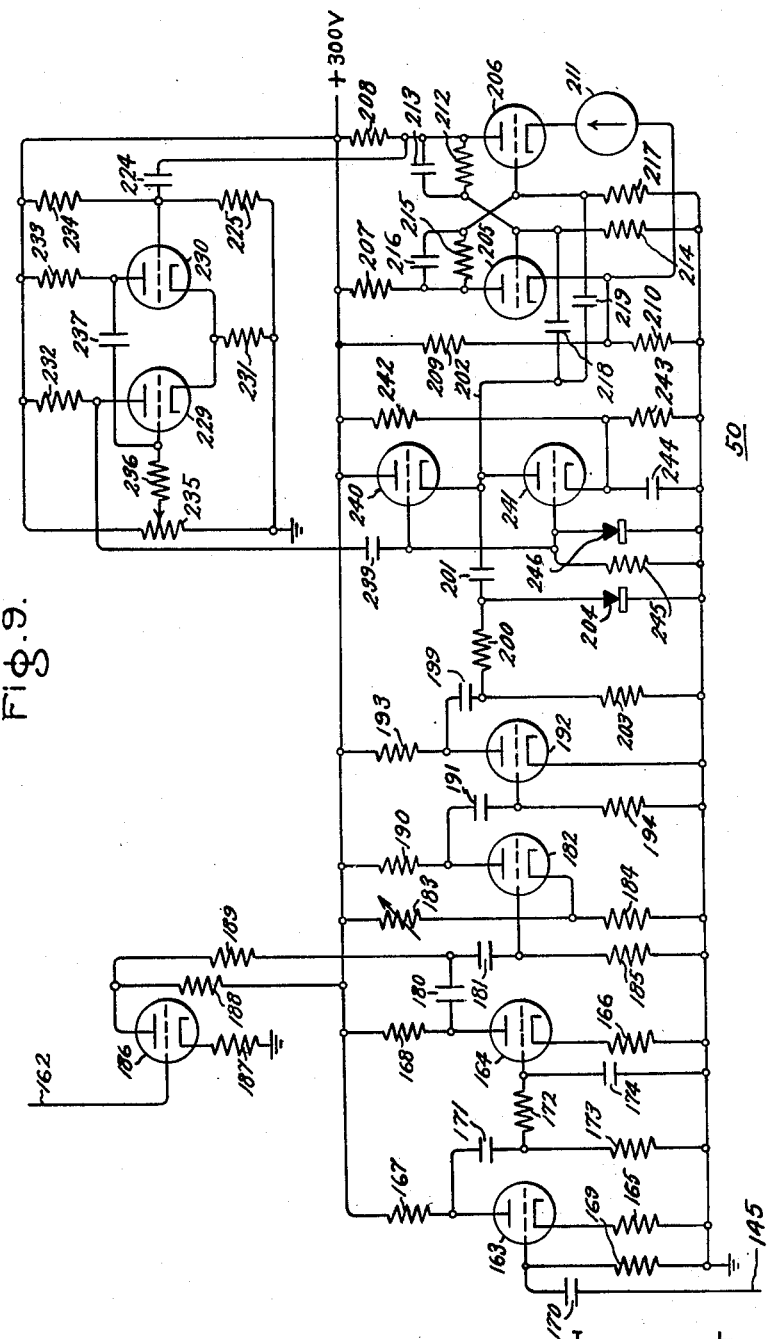

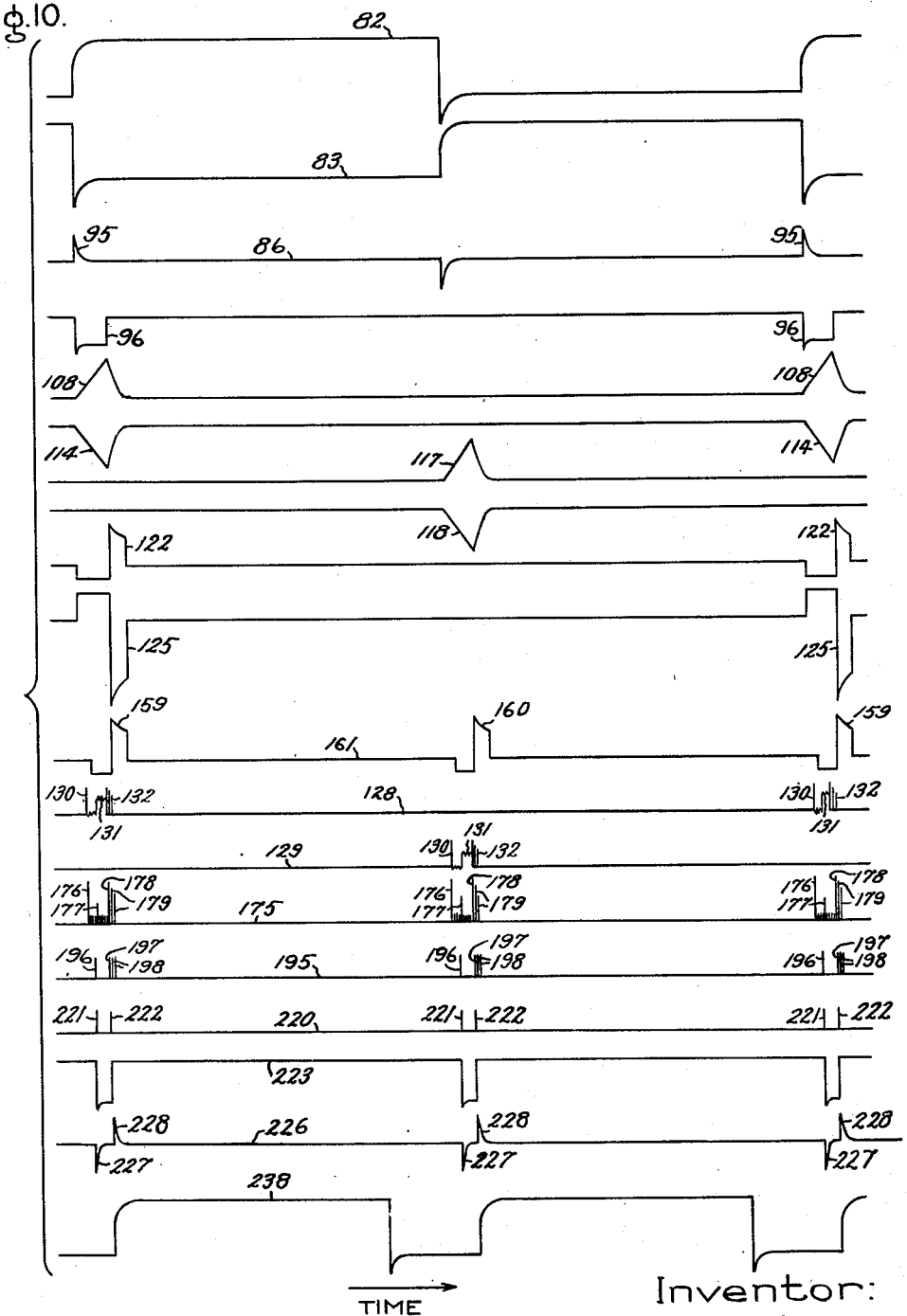

Patented Apr. 13, 1954

2,674,915

UNITED STATES PATENT OFFICE 2,674,915

NONCONTACTING WIDTH GAUGE

Roy E. Anderson, Schenectady, N. Y., assignor to General Electric Company, a corporation of New York Application January 7, 1950, Serial No. 137,463

8 Claims. (Cl. 88—14)

This invention relates to noncontacting width gauges, and in particular to width gauges employing electron camera tubes.

Noncontacting gauges are particularly desired for measuring the width of strip material traveling at high speeds and for measuring the width of objects at high temperature. The conditions of measurement are especially severe in steel rolling mills where the width of hot ingots and hot steel strip is to be measured. In addition to being very hot, the ingots may be moving, sometimes quite erratically. The gauge must be sturdy enough to operate reliably under conditions encountered in rolling mills.

An object of the invention is to provide an improved gauge for indicating the width of hot steel ingots in a rolling mill or for indicating the width of other objects.

The improved noncontacting width gauges comprise an electron camera, such as an iconoscope, orthicon, or image dissector, which views the hot ingot or other object, the width of which is to be measured. Scanning means are provided for scanning across the width of the camera's view, whereby the camera provides electric pulses having an average duration which is related to the width of the ingot. Electronic circuits are provided which are responsive to the average duration of these pulses to indicate the width of the ingot.

Other objects and advantages of the invention will appear as the description proceeds. The features of the invention which are believed to be novel and patentable are pointed out in the claims which form a part of this specification.

For a better understanding of the invention, reference is made in the following description to the accompanying drawings in which Fig. 1 is a schematic diagram of an improved, noncontacting width gauge; Fig. 2 is a representation of electric waveforms at various points in the Fig. 1 gauge; Fig. 3 is a schematic diagram of another improved noncontacting width gauge; Fig. 4 is a diagram of iconoscope circuits of the Fig. 3 gauge; Fig. 5 is a diagram of synchronizing signal generator circuits of the Fig. 3 gauge; Fig. 6 is a diagram of sweep circuits of the Fig. 3 gauge; Fig. 7 is a circuit diagram of a mixer of the Fig. 3 gauge; Fig. 8 is a diagram of delay circuits of the Fig. 3 gauge; Fig. 9 is a diagram of indicator circuits of the Fig. 3 gauge; and Fig. 10 is a representation of electrical waveforms at various points of the Fig. 3 gauge.

Referring now to Fig. 1, the width of a hot steel ingot 1 is to be measured. A light sensitive electron-optics device such as an electron camera tube, which is preferably an iconoscope 2, views ingot 1 through lens 3, as indicated by broken lines 4. The iconoscope, which may be of a conventional type designed for industrial use, has a photosensitive mosaic 5, a cathode 6, a control electrode 7, accelerating electrodes 8, and horizontal beam-deflecting plates 9 and 10. The vertical beam-deflecting plates 11 are not necessarily used in this apparatus and could be omitted. Lens 3 focuses an optical image of ingot 1 upon photosensitive mosaic 5.

Sweep circuits 12 provide potentials to deflecting plates 9 and 10 to scan the electron beam of the iconoscope across the width of the image focused on mosaic 5. As the beam crosses the image, an electric pulse is produced which is related in duration to the width of ingot 1, as hereinafter more fully explained. Sweep circuits 12 may also provide a potential to control electrode 7 for "blanking" during the return sweep of the electron beam and provide a synchronizing signal to trigger circuit 13 through delay circuit 14.

The electric pulses produced by the iconoscope are amplified by amplifier 15, are added to rectangular waveform pulses from trigger circuit 13, and after passing through clipping circuit 16 control the gating of a gated oscillator 17. Oscillator 17 provides oscillations at a fixed frequency but is biased so that it is inoperative to provide such oscillations except during times when pulses are received from clipping circuit 16. The oscillations provided by oscillator 17 are fed into a cycle counter 18 which responds to the number of cycles of such oscillations provided during each pulse produced by the iconoscope electron beam being swept across the ingot image and thereby indicates the width of ingot 1.

Operation of the Fig. 1 apparatus can be better understood by reference to the electric waveforms represented in Fig. 2. Referring to Figs. 1 and 2, curve 19 represents potential applied to deflecting plate 9, and curve 20 represents potential applied to deflecting plate 10. The electron beam of the iconoscope is periodically swept across the width of mosaic 5 during portions 21 of the sweep potentials 19 and 20. During portions 22 of the sweep potentials, the beam is returned to its initial position.

The potential applied to control electrode 7 is represented by curve 23. During the forward sweep (21) of the electron beam, a positive potential 24 is applied to the control electrode which intensifies the beam during the forward sweep. During the return sweep (22), negative potential 25 is applied to electrode 7, which cuts off or "blanks" the beam. Sweep circuits 12 may be of the type illustrated in Fig. 6, hereinafter described, or may be other sweep circuits known in the art which provide the desired waveforms. If the Fig. 6 circuit is used in this embodiment of the invention, the trigger circuit comprising vacuum tubes 87 and 88 may be modified to operate as a free-running multivibrator; or, the Fig. 6 circuit may be used without modification and driven by a suitable oscillator or pulse generator.

Again referring to Figs. 1 and 2, curve 26 represents the voltages produced at mosaic 5 as the electron beam is swept across the mosaic. The extremities of the sweep may extend somewhat beyond the mosaic edges. One or more initial pulses 27, of relatively short duration, occur shortly after the sweep begins when the electron beam first strikes the mosaic. A relatively long pulse 28 is produced as the beam crosses the image of ingot 1. A series of relatively short pulses 29 may be produced at the end of the sweep as the beam passes the edge of the mosaic. The small irregularities in curve 26 represent "noise" voltages which are inherently present.

Trigger circuit 13, which may be of the conventional type commonly called a "one-shot multivibrator," provides a rectangular waveform pulse of predetermined duration each time circuit 13 is triggered by the sweep circuits through delay circuit 14, which may be similar to one half of the delay circuits illustrated in Fig. 8, hereinafter described. Circuit 14 provides an impulse to trigger circuit 13 shortly after each sweep begins, and the constants of circuit 13 are arranged so that its output pulse terminates shortly before the sweep ends. Thus, the output of trigger circuit 13 consists of a series of rectangular waveform pulses as indicated by curve 30.

The voltages represented by curves 26 and 30 are added together at the input of clipping circuit 16 and thus provide at the input of the clipping circuit the voltage waveform represented by curve 31. Clipping circuit 16 may be of a conventional type which transmits only those voltage values which exceed in amplitude the pulses, shown in curve 30, supplied by the trigger circuit. Thus, pulses 28 only are transmitted through the clipping circuit, and pulses 27 and 29 are blocked, as illustrated by curve 32. The pulses 28 are then applied to gated oscillator 17 and turn the oscillator "on" for the duration of these pulses.

Curve 33 represents electric oscillations provided by gated oscillator 17. The oscillations 34 have a fixed frequency, but the oscillator is biased so that oscillations are provided only during the pulses 28. The number of oscillations 34 which occur during each iconoscope sweep is therefore proportional to the width of pulses 28 and hence to the width of ingot 1. These oscillations 34 actuate cycle counter 18, which thereupon indicates the width of ingot 1. Oscillator 17 and cycle counter 18 may be conventional apparatus which is well known in the art.

In the apparatus illustrated in Fig. 1, variations in the distance between ingot 1 and the iconoscope may affect the width indication since such variations obviously affect the relation between the width of ingot 1 and the width of the image focused upon mosaic 5. Such variations in distance are quite likely to occur in a steel rolling mill where the hot ingots sometimes buckle and bounce by considerable amounts during the rolling process and where the ingots may also vary in thickness. Preferred apparatus which substantially overcomes this difficulty and also provides greater sensitivity to small width changes is shown in Fig. 3.

Referring now to Fig. 3, the width of a hot ingot 35 is to be measured. Two electron light sensitive electron-optics devices which may comprise cameras such as iconoscopes 36 and 37 are employed. It will be appreciated that other electron camera tubes, such as orthicons or image dissectors, may be employed in place of the iconoscopes and that the circuit modifications necessary to accommodate these different types of camera tubes will be obvious to those skilled in the art. Iconoscope 36 views one edge of ingot 35 and iconoscope 37 views the other edge. That is, lens 38 forms a partial optical image of ingot 35, including one of its edges 39, on photosensitive mosaic 40 of iconoscope 36, while lens 41 forms a partial optical image of ingot 35, including the other of its edges 42, on photosensitive mosaic 43 of iconoscope 37. The fields of view of the two iconoscopes are represented by broken lines 44 and 45, respectively. Each of the two electron-optics devices formed by the iconoscopes 36 and 37 are positioned so that the optical axis of the field of view thereof (indicated by dotted lines 44a and 45a) is vertically aligned with a respective associated edge of the ingot. By this arrangement then, erroneous indications of width deviations due to up and down vibrations or bucking of the ingot, are minimized.

Separate sweep circuits 46 and 47 are provided for the two iconoscopes. These sweep circuits are synchronized by a signal generator 48 so that the two partial images are scanned alternately. Iconoscopes 36 and 37 thus alternately produce electric pulses, the widths of which are related to the widths of the partial images formed on the respective iconoscope mosaics.

As the apparatus is generally used, there is a standard or desired ingot width, deviations from which are to be indicated. The two iconoscopes 36 and 37 are preferably spaced apart a distance equal to this desired width so that iconoscope 36 is normally directly above one edge of ingot 35 while iconoscope 37 is directly above the other edge. With this arrangement, any buckling or up or down motion of the ingot does not substantially affect the sizes of the partial images formed upon the iconoscope mosaics, and hence does not substantially affect the width indication. Any lateral motion of the ingot increases the width of one partial image but decreases the width of the other partial image by a corresponding amount so that the average width of the two partial images, and hence the width indication as hereinafter explained, is not substantially affected. Deviations from the desired width, however, cause variations in the average width of the two partial images and hence are indicated.

The pulses produced by iconoscopes 36 and 37 are combined in a mixer 49 and then actuate indicator circuits 50. Delay circuits 51 are provided to block undesired pulses which are produced when the electron beam of an iconoscope enters the mosaic, as is hereinafter more fully explained. To facilitate an understanding of how the various circuits are connected together, the connections in Fig. 3 are labeled with the same reference numerals as in the circuit diagrams shown in Figs. 4-9.

Refer now to Fig. 4 which illustrates in more detail typical electrical circuits for one of the iconoscope cameras. Since the two cameras may have identical circuits, only one is described.

The iconoscope 36, which may be a conventional type designed for industrial use, has a photosensitive mosaic 40, a cathode 52, a control electrode 53, accelerating electrodes 54, horizontal deflection plates 55 and 56, and vertical deflection plates 57. Operating potentials for the cathode, control electrode, and one or more of the accelerating electrodes may be supplied from taps on a voltage divider 58 which is connected to a suitable source of negative direct voltage, minus one thousand volts being a suitable value for at least one type of iconoscope.

Horizontal deflecting plates 55 and 56 are connected to adjustable taps on a voltage divider 59 which may be connected to a source of positive direct voltage, plus 300 volts, for example. The adjustable taps of voltage divider 59 permit adjustment of the steady state potentials applied to plates 55 and 56 which adjust the position of the iconoscope electron beam during times when no sweep potentials are applied. Potentials for sweeping the beam across mosaic 40 to scan an image are applied to plates 55 and 56 by the sweep circuits through connections 60 and 61. Blanking voltage is applied to the control electrode through connection 62.

Vertical deflecting plates 57 are connected to adjustable taps on voltage divider 63 which is connected to a suitable source of positive voltage. These adjustable taps permit adjustment of the vertical position of the iconoscope electron beam. Although sweep potentials need not be applied to the vertical deflecting plates, since vertical scanning is unnecessary in this apparatus, high frequency vertical sweep voltage is preferably applied through capacitors 64 and 65 and connections 66 and 67, as hereinafter explained.

A microammeter 68 may be connected to one or more of the accelerating electrodes 54, as shown, to facilitate adjustment of the operating potentials of the iconoscope. This is conventional and requires no further description. Voltage pulses produced when the image on mosaic 40 is scanned are applied to the mixer through connection 69.

Referring now to Fig. 5, the synchronizing signal generator 48 may be a conventional free running multivibrator. In a preferred form, the signal generator comprises two triodes 70 and 71 having plate load resistors 72 and 73, respectively. The control electrodes of the two vacuum tubes 70 and 71 are connected through resistors 74 and 75 to taps of voltage dividers 76 and 77, respectively, which are connected between a positive voltage source and ground. Feedback connections are provided from the plate of tube 71 to a tap on resistor 74 through capacitor 78, and from the plate of tube 70 to a tap on resistor 75 through capacitor 79. This multivibrator operates in a well-known manner to provide voltages to the two sweep circuits through connections 80 and 81. The waveforms of these two voltages are represented in Fig. 10 by curves 82 and 83, respectively.

Refer now to Fig. 6 which shows a preferred form of the horizontal sweep circuits 46, 47. Since the two sets of horizontal sweep circuits may be identical, only one will be described. The voltage waveform illustrated at 82, Fig. 10, is supplied by the signal generator through connection 80. This voltage is differentiated by capacitor 84 and resistor 85 so that a series of relatively short voltage pulses, represented in Fig. 10 by curve 86, are applied to the control electrode of a vacuum tube 87. Tube 87 is connected with another vacuum tube 88 in a cathode coupled trigger circuit. The cathodes of these two vacuum tubes are connected together, as shown, and are connected to ground through a common cathode resistor 89. The plates are connected to a suitable source of positive direct voltage through load resistors 90 and 91, respectively. The control electrode of tube 87 is connected to a voltage divider comprising resistors 92 and 85 connected in series between the positive voltage source and ground. The potential of this control electrode is such that tube 87 is normally cut off when tube 88 conducts current. The control electrode of tube 88 is connected to the positive voltage source through a resistor 93 and is connected to the plate of tube 87 through a capacitor 94.

In this trigger circuit the control electrode of tube 88 is normally at a relatively high positive potential, and tube 88 conducts current. This produces a voltage drop across cathode resistor 89 which is sufficient to keep tube 87 cut off. When a positive voltage pulse, such as a pulse 95, Fig. 10, is applied to the control electrode of tube 87, this tube conducts current and the potential of its plate drops. This drop in potential drives the control grid of tube 88 negative and cuts off the tube. Tube 87 continues to conduct current as long as tube 88 is cut off. However, capacitor 94 receives current through resistor 93, and the control electrode of tube 88 gradually becomes more positive. After a time, depending upon the values of resistor 93 and capacitor 94, tube 88 again conducts current and cuts off tube 87. The result is a rectangular voltage pulse represented at 96, Fig. 10, at the plate of tube 87. These pulses 96 are initiated each time a pulse 95 is applied to the control electrode of tube 87, which may be at a rate of 10 to 30 per second, depending upon the frequency of the synchronizing signal generator. The duration of pulses 96 is uniform since it is determined by the values of resistor 93 and capacitor 94. This duration may be 0.0005 second, for example.

Pulses 96 are applied through a capacitor 97 to a bootstrap sweep generator comprising triodes 98 and 99 and diode 100. The cathode of tube 98 is connected to ground, and its plate is connected through a resistor 101 and diode 100 in series to a suitable source of positive direct voltage. The control electrode of tube 98 is connected through a resistor 102 to a tap on a voltage divider comprising resistors 103 and 104 and also through resistor 102 to capacitor 97. Resistors 103 and 104 in series are connected between the source of positive voltage and ground. The plate of tube 99 is connected to the positive voltage source while its cathode is connected to ground through a resistor 105. The cathode of tube 99 is also connected through a capacitor 106 to the cathode of diode 100. The plate of tube 98 is connected to ground through a capacitor 107 and is also connected to the control electrode of tube 99.

Since the control electrode of tube 98 is normally positive relative to its cathode, the tube conducts maximum current so that there is a relatively large voltage drop across resistor 101 and a relatively small voltage across capacitor 107. When a negative pulse 96 is applied to the control electrode of tube 98, the conduction of current by this tube is reduced and the potential at its plate tends to rise. However, capacitor 107 opposes this rise in potential so the plate potential can rise only as fast as capacitor 107 charges through resistor 101.

The rise in plate potential of tube 98 also increases the potential at the control electrode of tube 99. Tube 99 acts as a cathode follower so that its cathode potential increases by substantially the same amount as its control electrode potential. This increase in potential is transmitted through capacitor 106 to the cathode of diode 100 and thus tends to maintain the voltage across resistor 101 constant so that constant charging current flows to capacitor 107. This makes the rise in plate potential of tube 98 very linear, and since the potential at the cathode of tube 99 follows the potential at the plate of tube 98, a very linear sweep voltage is provided across resistor 105. The waveform of this voltage is illustrated at 108, Fig. 10. At the end of pulse 96, the control electrode of tube 98 again becomes positive, tube 98 conducts current, and the plate potential of this tube rapidly drops to its former value.

The sweep voltage is transmitted through capacitor 109 to a phase inverter comprising triode 110. The cathode of tube 110 is connected to ground through resistor 111, and the plate is connected to the positive voltage source through resistor 112. The control electrode of tube 110 is connected to capacitor 109, and is also connected to a tap on cathode resistor 111 through resistor 113. The values of resistors 111 and 112 are so related that changes in potential at the control electrode of tube 110 cause changes in potential at its cathode and at its plate which are substantially equal but of opposite polarity. Thus, if the control electrode of tube 110 becomes more positive, its cathode also becomes more positive, but its plate becomes less positive or more negative. The potential at the cathode is represented by curve 103, Fig. 10, while the potential at the plate is represented by curve 114. These potential changes at the cathode and plate of tube 110 are transmitted to respective horizontal deflecting plates of the iconoscope through capacitors 115 and 116 and connections 60 and 61.

The other set of sweep circuits 47 applies similar horizontal sweep potentials to the other iconoscope. However, since scanning is to take place alternately in the two iconoscopes, the two sets of sweep potentials must alternate in time. This is accomplished by the fact that the two sweep circuits are triggered by voltages obtained from opposite halves of the synchronizing multivibrator so that when a positive synchronizing voltage is applied to one sweep circuit, a negative voltage is applied to the other, as is shown by curves 82 and 83, Fig. 10. The horizontal sweep potentials applied to the second iconoscope are represented by curves 117 and 118, Fig. 10.

Again referring to Fig. 6, a differentiator circuit comprising capacitor 119 and resistor 120 in series is connected between connection 61 and ground, as shown. This circuit differentiates the changes in plate potential of tube 110 and applies to the control electrode of a vacuum tube 121 a voltage having the waveform shown by curve 122, Fig. 10. Vacuum tube 121, with its cathode resistor 123 and its plate load resistor 124, is connected as a voltage amplifier so that the potential at its plate has the waveform illustrated by curve 125, Fig. 10. It may be noted that this potential has a relatively positive value during the linear portion of the sweep voltages 108 and 114 and has a large relatively negative value during the return portions of the sweep voltages. The changes in this potential are applied to the control electrode of the iconoscope through capacitor 126 and connection 62 and serve to cut off or "blank" the electron beam of the iconoscope during the return sweep. Connection 127 is provided from the plate of tube 110 to the delay circuits for purposes hereinafter explained.

As the electron beam is swept across the mosaic of iconoscope 36, Fig. 3, electric pulses are produced as represented by curve 128, Fig. 10. Similar electric pulses, represented by curve 129, are produced by iconoscope 37. The initial pulse or pulses 130 which are of relatively short duration are produced as the electron beam strikes one edge of the mosaic. A relatively wide pulse 131 is produced as the beam travels across the partial optical image of the ingot, and a series of pulses 132 is produced as the beam crosses the other edge of the mosaic. The pulses represented by curves 128 and 129 are combined in the mixer circuit.

Referring now to Fig. 7, the mixer 49 comprises two vacuum tubes 133 and 134 which are preferably pentodes. Tubes 133 and 134 are connected as cathode followers having cathode load resistors 135 and 136, respectively. The control electrodes of the two tubes are connected to taps on their respective cathode resistors through resistors 137 and 138, as shown. The plates of the tubes are connected to a suitable source of positive direct voltage which may have a value of 180 volts, for example. The suppressor electrodes may be connected to the cathodes, and the respective screen electrodes may be connected to the positive voltage source through resistors 139 and 140 and to the cathodes through capacitors 141 and 142. Resistors 143 and 144 are connected in series between the two cathodes, and an output connection 145 is connected to the circuit junction between these two resistors.

Electric pulses 128, Fig. 10, from iconoscope 36, Fig. 4, are applied to the control electrode of tube 133, Fig. 7, through connection 69. Pulses 129 from iconoscope 37 are applied to the control electrode of tube 134 through connection 146. The two sets of pulses are combined in the mixer, and both appear at output connection 145.

Referring now to Fig. 8, delay circuits 51 comprise two diodes 147 and 148. Two voltage dividers comprising resistors 149, 150 and resistors 151, 152, respectively, are each connected between ground and a suitable source of positive direct voltage, 300 volts, for example. The plate of diode 147 is connected through resistor 153 to the circuit junction between resistors 149 and 150, and the plate of diode 148 is connected through resistor 154 to the circuit junction between resistors 151 and 152. Two capacitors 155 and 156 are connected in series between the two diode plates, and a resistor 157 is connected between the circuit junction of these two capacitors and ground.

Voltage from sweep circuits 46, Fig. 6, is applied to the cathode of vacuum tube 147, Fig. 8, through connection 127. This voltage has a waveform illustrated by curve 114, Fig. 10. Voltage having a waveform illustrated by curve 118, Fig. 10, is applied to the cathode of tube 148, Fig. 8, from sweep circuits 47 through connection 158.

Normally, the cathodes of tubes 147 and 148 are more positive than the plates and, therefore, the tubes do not conduct current. However, when sweep circuits 46 provide sweep potentials to the horizontal deflecting plates of iconoscope 36, the cathode of tube 147 becomes less positive, as illustrated by curve 114, and at a certain point in such sweep determined by the bias potential at the plate of tube 147, the cathode of this tube becomes negative with respect to its plate, and the tube conducts current. The plate potential then follows the cathode potential during the remainder of the sweep. As a result, the plate potential of tube 147 has the same waveform as curve 114 except that the initial portion of the sweep is eliminated. This potential is differentiated by capacitor 155 and resistor 157 which thereby produces a waveform represented at 159, Fig. 10. A similar action occurs in diode 148 which produces the waveform illustrated at 160, Fig. 10. The combination of these two waveforms, which produces the complete curve 161, Fig. 10, appears at output connection 162, Fig. 8, which is connected to the circuit junction of capacitors 155 and 156.

Referring now to Fig. 9, which is a circuit diagram of indicator circuits 50, the output of the mixer is applied through connection 145 to a two-stage vacuum tube amplifier and differentiator circuit comprising vacuum tubes 163 and 164. The cathodes of tubes 163 and 164 are connected to ground through cathode resistors 165 and 166, and their plates are connected to a suitable source of positive direct voltage through load resistors 167 and 168, respectively. The control electrode of tube 163 is connected to ground through grid leak resistor 169 and is connected to connection 145 through capacitor 170. The plate of tube 163 is connected to the control electrode of tube 164 through capacitor 171 and resistor 172 in series. The circuit junction of capacitor 171 and resistor 172 is connected through resistor 173 to ground, and the control electrode of tube 164 is connected to ground through capacitor 174. This network of resistors and capacitors between the two vacuum tubes differentiates the voltage waveforms whereby the potential at the plate of tube 164 has the waveform illustrated by curve 175, Fig. 10.

The significant pulses in this waveform, curve 175, are the initial pulse 176 which is produced as the iconoscope electron beam crosses the first edge of the photosensitive mosaic, a pulse 177 which is produced when the electron beam first reaches the optical image focused on the mosaic, a pulse 178 produced when the electron beam first reaches the other end of the mosaic, and other pulses 179 produced as the beam is swept beyond the limits of the photosensitive mosaic. The smaller pulses represent noise voltages inherently present. In this series of pulses, the average time interval between pulses 177 and 178 is related to the width of the ingot being measured. The other pulses are superfluous and should be blocked or otherwise removed as hereinafter explained. With this arrangement, pulses 178 are a fixed reference with respect to which the time position of pulses 177 is determined. An alternative arrangement would be to use pulses 176 as the fixed reference.

The pulses at the plate of vacuum tube 164, Fig. 9, are transmitted through capacitors 180 and 181 in series to the control electrode of a vacuum tube 182. The cathode of tube 182 is connected to a tap on a voltage divider comprising resistors 183 and 184 connected in series between a source of positive voltage and ground. The control electrode of tube 182 is connected to ground through a resistor 185. This system of connections maintains the control electrode of tube 182 greatly negative with respect to its cathode so that this tube normally conducts no current even when positive pulses 176 are applied to its control electrode from vacuum tube 164.

Voltages having the waveform shown by curve 161, Fig. 10, are applied through connection 162 to the control electrode of a vacuum tube 186, Fig. 9. This vacuum tube is connected as a voltage amplifier with its cathode connected to ground through a resistor 187 and its plate connected to a source of positive voltage through a resistor 188. The plate of tube 186 is also connected through resistor 189 to the circuit junction between capacitors 180 and 181. When negative voltage is applied to the control electrode of tube 186, the plate of this tube becomes more positive, and this in turn carries the control electrode of tube 182 positive. This reduces the negative bias of tube 182 sufficiently for this tube to conduct current when positive pulses 177 and 178 are received from tube 164. Tube 182 thus acts as a gate under the control of voltage received through connection 162 from the delay circuits. Referring to curve 161, Fig. 10, and remembering that positive voltage is applied to the control electrode of tube 182 when the waveform of curve 161 has a negative value, it may be noted that tube 182 will not conduct current when pulse 176 arrives at its control electrode, and thus this pulse is blocked. However, the control electrode of tube 182 is at a higher positive potential when pulses 177 and 178 arrive, and therefore these pulses are transmitted through the tube. The length of time in the initial portion of each sweep during which tube 182 blocks pulses can be adjusted by adjusting the tap voltages of votage dividers 149, 150 and 151, 152, Fig. 8. A portion of each divider may have an adjustable resistance value, as indicated in the drawing, for this purpose.

The plate of tube 182, Fig. 9, is connected to a source of positive direct voltage through a resistor 190. Each time tube 182 conducts current, there is a voltage drop across resistor 190 so that pulses 177, 178 and 179, Fig. 10, appear as negative pulses at the plate of tube 182. These negative pulses are transmitted through capacitor 191 to the control electrode of vacuum tube 192.

The plate of tube 192 is connected to the positive voltage source through a resistor 193. The cathode of this tube is connected directly to ground, and the control electrode is connected to ground through resistor 194. Tube 192 normally conducts current, but when negative pulses from tube 182 are applied to the control electrode of tube 192, it is driven to cutoff, and pulses of uniform positive amplitude appear at its plate. Tube 192 thus acts as a clipper which clips all of the pulses to the same amplitude. The pulses appearing at the plate of tube 192 are represented by curve 195, Fig. 10. Pulses 196 are produced as the electron beams of the iconoscopes first reach the optical images focused on the mosaics, pulses 197 are produced when the electron beams reach the edges of the mosaics, and pulses 198 are produced as the beams are swept past the edges of the mosaics.

Pulses 196 and 197 are transmitted through capacitor 199, resistor 200 and capacitor 201, connected in series, to the input connection 202 of a trigger circuit means comprising an Eccles-Jordan trigger circuit. Pulses 198 are blocked in a manner hereinafter described. Any negative pulses which may appear at the plate of tube 192 are removed by a clipping circuit comprising a resistor 203 connected between ground and the circuit junction of capacitor 199 and resistor 200 and a rectifier 204 connected between ground and the circuit junction of resistor 200 and capacitor 201. The polarity of rectifier 204 is such that it offers relatively little resistance to negative pulses and thus by-passes these pulses to ground but offers a much higher resistance to positive pulses.

The Eccles-Jordan trigger circuit comprises two triodes 205 and 206 having their plates connected to a positive direct voltage source through resistors 207 and 208, respectively. The cathode of tube 205 is connected to a tap on a voltage divider comprising resistors 209 and 210 connected in series between the source of positive voltage and ground, as shown. The cathode of tube 206 is preferably connected to this same tap of the voltage divider through an indicating instrument 211 which preferably is responsive to average or D.-C. values of current. Instrument 211 thus provides indications which are related to the average current conducted by tube 206. The control electrode of tube 205 is connected to the plate of tube 206 through a resistor 212 and a capacitor 213 connected in parallel and is connected to ground through resistor 214. The control electrode of tube 206 is connected to the plate of tube 205 through resistor 215 and capacitor 216 connected in parallel, and is connected to ground through resistor 217. Input connection 202 is connected to the control electrode of each vacuum tube through capacitors 218 and 219, respectively.

As is well known, the Eccles-Jordan trigger circuit has two stable operating states. In one such state, tube 205 conducts current, while tube 206 does not; and in the other state, tube 206 conducts current while tube 205 does not. Positive voltage pulses applied to the control electrodes of tubes 205 and 206 trigger the Eccles-Jordan circuit and cause it to shift from one operating state to the other.

The pulses at input connection 202 have the form illustrated by curve 220, Fig. 10. The average time interval between pulses 221 and 222 is related to the width of the ingot being measured, as has been explained. Just before pulse 221 arrives, tube 205 is conducting current and tube 206 is not. Pulse 221 triggers the Eccles-Jordan circuit and causes it to switch to its other operating state in which tube 206 conducts current. Pulse 222 then triggers the circuit back to its original state. The length of time in each sweep cycle during which tube 206 conducts current, and hence the average or D.-C. value of current conducted by tube 206, is proportional to the average time interval between pulses 221 and pulses 222, and hence is related to the width of the ingot being measured. Instrument 211 gives an indication proportional to this average current. Instrument 211 can be calibrated to provide direct readings in terms of ingot width when the two iconoscopes are spaced a predetermined distance apart, or in terms of deviation from a standard width corresponding to the spacing between the two iconoscopes.

The potential at the plate of tube 206 has a waveform illustrated by curve 223, Fig. 10. This waveform is differentiated by a capacitor 224 and a resistor 225, Fig. 9, to give the waveform illustrated by curve 226, Fig. 10, having pairs of voltage pulses 227 and 228 which are alternately positive and negative. Positive pulses 228 occur when the Eccles-Jordan circuit is triggered back to its first operating state in which tube 205 conducts current, and thus correspond to the end of a sweep cycle.

Positive pulses 228 trigger a cathode-coupled trigger circuit comprising vacuum tubes 229 and 230, Fig. 10. The cathodes of tubes 229 and 230 are connected together and are connected to ground through a common cathode resistor 231. The plates of these tubes are connected to a positive direct voltage source through resistors 232 and 233, respectively. The control electrode of tube 230 is connected to a tap on a voltage divider comprising resistors 234 and 235. The control electrode of tube 229 is connected to a tap on a voltage divider 235 through a resistor 236. The two voltage dividers are connected between ground and a source of positive direct voltage, as shown. The control electrode of tube 229 is also connected through a capacitor 237 to the plate of tube 230.

The circuit constants of this trigger circuit are such that tube 229 normally conducts current while tube 230 is normally cut off. When positive pulses 228 are applied to the control electrode of tube 230, the circuit is triggered so that tube 230 becomes conductive and tube 229 is cut off. The control electrode of tube 229 is maintained sufficiently negative to keep this tube cut off until a sufficient amount of the charge on capacitor 237 leaks off through resistor 236 for tube 229 to become conductive again, which triggers the circuit back to its original operating state. The length of time during which tube 229 is nonconducting, therefore, depends upon the circuit constants. The voltage waveform at the plate of tube 229 is represented by curve 238, Fig. 10.

The voltage represented by curve 238 is transmitted through capacitor 239, Fig. 9, to the control electrodes of two vacuum tubes 240 and 241 which comprise a clamping circuit which blocks undesired pulses. The plate of tube 240 is connected to a source of positive direct voltage. The cathode of tube 240 is connected to the plate of tube 241 and to input connection 202 of the Eccles-Jordan trigger circuit. The cathode of tube 241 is connected to a tap on a voltage divider comprising resistors 242 and 243 connected in series between the positive voltage source and ground. The cathode of tube 241 is also connected to ground through capacitor 244. The control electrodes of tubes 240 and 241 are connected together and are connected to ground through a resistor 245 and a rectifier 246 in parallel. The polarity of rectifier 246 is such that it offers relatively little resistance to current flow when the control electrode of tube 241 is at negative potential but presents a much larger resistance when the control electrode is at positive potential. This eliminates the possibility of any substantial negative potential appearing at the control electrodes of tubes 240 and 241.

The control electrodes of tubes 240 and 241 are normally at ground potential while the cathodes of these tubes are substantially positive with respect to ground. Therefore, tubes 240 and 241 normally conduct no current and have no more effect upon the circuit than would small capacitors connected in their place. However, when positive voltage is applied to the control electrodes of these two tubes, as it is during the positive portions of the curve 238 waveform, tubes 240 and 241 conduct current and the conductance of these two tubes then determines the potential of connection 202. In other words, tubes 240 and 241 provide a low impedance path when they conduct current which effectively "grounds" any voltage pulses which would otherwise be transmitted by capacitor 201. In this way the clamping circuit blocks the undesired pulses 198 in waveform 195, Fig. 10, and assures that the Eccles-Jordan trigger circuit will be in its proper operating state ready to receive pulses 221 at the beginning of each sweep cycle.

Although satisfactory operation can be obtained without vertical deflection of the iconoscope electron beams, in general a larger signal from the iconoscopes, and hence greater overall sensitivity of the gauge to faint images, can be obtained by vertical scanning of the iconoscope mosaic at a rate which is rapid compared to the horizontal scanning so that a relatively wide area of the mosaic is utilized instead of a single line. Referring again to Fig. 3, vertical scanning preferably is accomplished by having a high frequency oscillator 247 connected to supply high frequency alternating voltage to the vertical deflecting plates of each iconoscope. Oscillator 247 may be a conventional type which operates at a frequency in the order of one megacycle per second. These oscillations are transmitted to the vertical deflecting plates of iconoscope 36 through connections 66 and 67 and capacitors 64 and 65 and are transmitted to the vertical deflecting plates of iconoscope 37 through connections 248 and 249 and capacitors 250 and 251.

When the object to be measured is a hot steel ingot, the brightness of the glowing ingot itself is sufficient to assure adequate contrast between the ingot image and the background to properly operate the noncontacting width gauge. However, the gauge is not limited in use to self-luminous objects since a sufficient contrast between the image and the background can usually be obtained quite easily by illuminating the object to be measured, especially when rapid vertical scanning of the iconoscope mosaics is employed.

Having described the principles of this invention and the best mode in which I have contemplated applying those principles, I wish it to be understood that the apparatus described is illustrative only and that other means can be employed without departing from the true scope of the invention.

What I claim as new and desire to secure by Letters Patent of the United States is:

1. A noncontacting gauge for indicating the width of an object, comprising a plurality of electron cameras each positioned to have the optical axis of the field of view thereof vertically aligned with a respective opposite edge of such object, for effectively scanning the view of each of said cameras along a line extending in the direction of width of such object across the respective edge, whereby each of said camera provides an electric signal related to the position of the edge of such objects mixing circuit means operatively coupled to the output of both of said electron cameras for combining the electric signals of both cameras and thereby providing a composite electric signal related to the total width of such object, an electric signal responsive width-indicating apparatus operatively connected to the output of said mixing circuit means in responsive relation to the signals so produced.

2. A noncontacting gauge for measuring the width of hot steel ingots, comprising two electron cameras each having a photosensitive mosaic and adapted to be positioned on opposite sides of the ingot, means to form a partial optical image of such ingot including only one of its edges upon the mosaic of one of said electron cameras, means to form a partial optical image of such ingot including only the opposite one of its edges upon the mosaic of the other of said electron cameras, scanning means to provide scanning across the width of such partial images alternately, whereby said electron cameras produce relatively long electric pulses which are related in average duration to the total width of such ingot, mixer means coupled to each of said electron cameras for combining such pulses, a trigger circuit having two stable states of operation, means operatively connecting the output of said mixer means to said trigger circuit for triggering the same from one of its operating states to the other at the beginning and end of said electric pulses, first gating means synchronized with said scanning means to block pulses preceding the beginning of each scan, second gating means synchronized with said trigger circuit to block pulses following the ending of each scan, and a current responsive indicating device connected to said trigger circuit in responsive relation to the current conducted during one of the operating states thereof.

3. A noncontacting gauge for indicating the width of an object comprising at least two electron cameras each having a photosensitive surface and adapted to be positioned on opposite sides of the object, means to form a partial optical image of such object including one of its edges upon the photosensitive surface of one of said cameras, means to form a partial optical image of such object including the edge thereof opposite the first-mentioned edge upon the photosensitive surface of the other of said cameras, means to provide scanning across the width of such partial images whereby electric pulses are produced which are related to the total width of such object, electric pulse responsive width indicating apparatus operatively connected to said cameras in responsive relation to the pulses so produced, and gating control means operatively connected to said indicating apparatus to prevent operation of the same by pulses other than those related to the width of the object being measured.

4. A noncontacting gauge for indicating the width of an object comprising a plurality of light sensitive electron-optic devices each positioned to view only a respective opposite edge of such object with the optical axis of the field of view of each electron-optics device being in vertical alignment with the respective edge of the object, means for effectively scanning the view of each of said electron-optics devices along a line extending in the direction of the width of such object across the respective edge whereby each electron-optics device provides an electric signal related to the position of the edge of such object, mixing circuit means operatively coupled to the output of all of said electron-optics devices for combining the electric signals of all the electron-optics devices and thereby producing a composite electric signal related to the total width of such object, and electric signal responsive width indicating means operatively connected to the output of said mixing circuit means for providing an indication of the total width of the object being viewed.

5. A noncontacting gauge for indicating the width of an object comprising a pair of light sensitive electron-optic devices each positioned to view only a respective opposite edge of such object with the optical axis of the field of view of each electron-optics device being in vertical alignment with the respective edge of the object, means for effectively scanning the view of each of said electron-optics devices along a line extending in the direction of the width of such object, across the respective edge, whereby each electron-optics device provides an electric signal related to the position of the edge of such object, mixing circuit means operatively coupled to the output of both of said electron-optics devices for combining the electric signals of both devices and thereby provide a composite electric signal related to the total width of such object, and a current responsive indicating device operatively connected to the output of said mixing circuit means for providing an indication of the total width of the object being viewed.

6. A noncontacting gauge for indicating the width of an object comprising a pair of light sensitive electron-optics devices each positioned to view only a respective opposite edge of such object, means for effectively scanning the view of each of said electron-optics devices along a line extending in the direction of the width of such object across the respective edge whereby each electron-optics device provides a pulsed electric signal related to the position of the edge of such object, trigger circuit means having two stable states of operation, means operatively coupling the output of said electron-optics devices to said trigger circuit means for effectively triggering the same from one of the operating states thereof to the other with the pulsed electric signals produced by said electron-optics devices, and a current responsive indicating device coupled to the output of said trigger circuit means and responsive to the current conducted during one of the operating states thereof for providing an indication of the total width of the object being viewed.

7. A noncontacting gage for indicating the width of an object comprising a pair of light sensitive electron-optics devices each positioned to view only a respective opposite edge of such object, means for effectively scanning the view of each of said electron-optics devices along a line extending in the direction of the width of such object across the respective edge whereby each electron-optics device provides a pulsed electric signal related to the position of the edge of such object, trigger circuit means having two stable states of operation, means operatively coupling the output of said electron-optics devices to said trigger circuit means for effectively triggering the same from one of the operating states thereof to the other with the pulsed electric signals produced by said electron-optics devices, gating control means operatively coupled to said trigger circuit means to prevent operation of the same by pulsed electric signals other than those related to the position of the edges of the object being measured, and a current responsive indicating device coupled to said trigger circuit means and responsive to the current conducted during one of the operating states thereof for providing an indication of the total width of the object being viewed.

8. A non-contacting inspection gauge for strip material including in combination first electron-optics means having the optical axis of the field of view thereof vertically aligned with a respective longitudinally extending edge of the strip of material being gauged for producing a first series of electric pulses having durations which vary with variations in the position of said one longitudinally extending edge of the strip of material, second electron-optics means having the optical axis of the field of view thereof vertically aligned with the remaining longitudinally extending edge of the strip of material for producing a second series of electric pulses having durations which vary with the variations in the position of the remaining longitudinally extending edge of the strip of material, electric signal combining means coupled to the output of both of said electron-optics means for combining said first and second series of electric pulses to produce a composite electric signal representative of the width of the material, and an indicating device operatively coupled to the output of said electric signal combining means for providing an indication of the width of the material.

References Cited in the file of this patent

UNITED STATES PATENTS

| Number | Name | Date |
|---|---|---|
| 2,117,878 | Friedmann | May 17, 1938 |
| 2,237,811 | Cockrell | Apr. 8, 1941 |
| 2,240,722 | Snow | May 6, 1941 |
| 2,301,254 | Carnahan | Nov. 10, 1942 |
| 2,324,270 | Schlesman | July 13, 1943 |
| 2,447,024 | Metcalf | Aug. 17, 1948 |
| 2,474,906 | Meloon | July 5, 1949 |
| 2,488,430 | Offner | Nov. 15, 1949 |
| 2,514,985 | Banner | July 11, 1950 |
| 2,548,755 | Vossberg et al. | Apr. 10, 1951 |